July 17, 1956　　　M. L. D'ORNELLAS　　　2,755,030
MULTIPLE TAPE APPARATUS
Filed May 4, 1951　　　　　　　　　　　　　　6 Sheets-Sheet 1

Inventor
Manuel L. d'Ornellas
by
Attys

July 17, 1956 M. L. D'ORNELLAS 2,755,030
MULTIPLE TAPE APPARATUS
Filed May 4, 1951 6 Sheets-Sheet 2

Inventor
Manuel L. d'Ornellas
by
Attys

July 17, 1956  M. L. D'ORNELLAS  2,755,030
MULTIPLE TAPE APPARATUS
Filed May 4, 1951  6 Sheets-Sheet 3

Inventor
Manuel L. d'Ornellas
by Hill, Sherman, Meroni, Gross & Simpson
Attys.

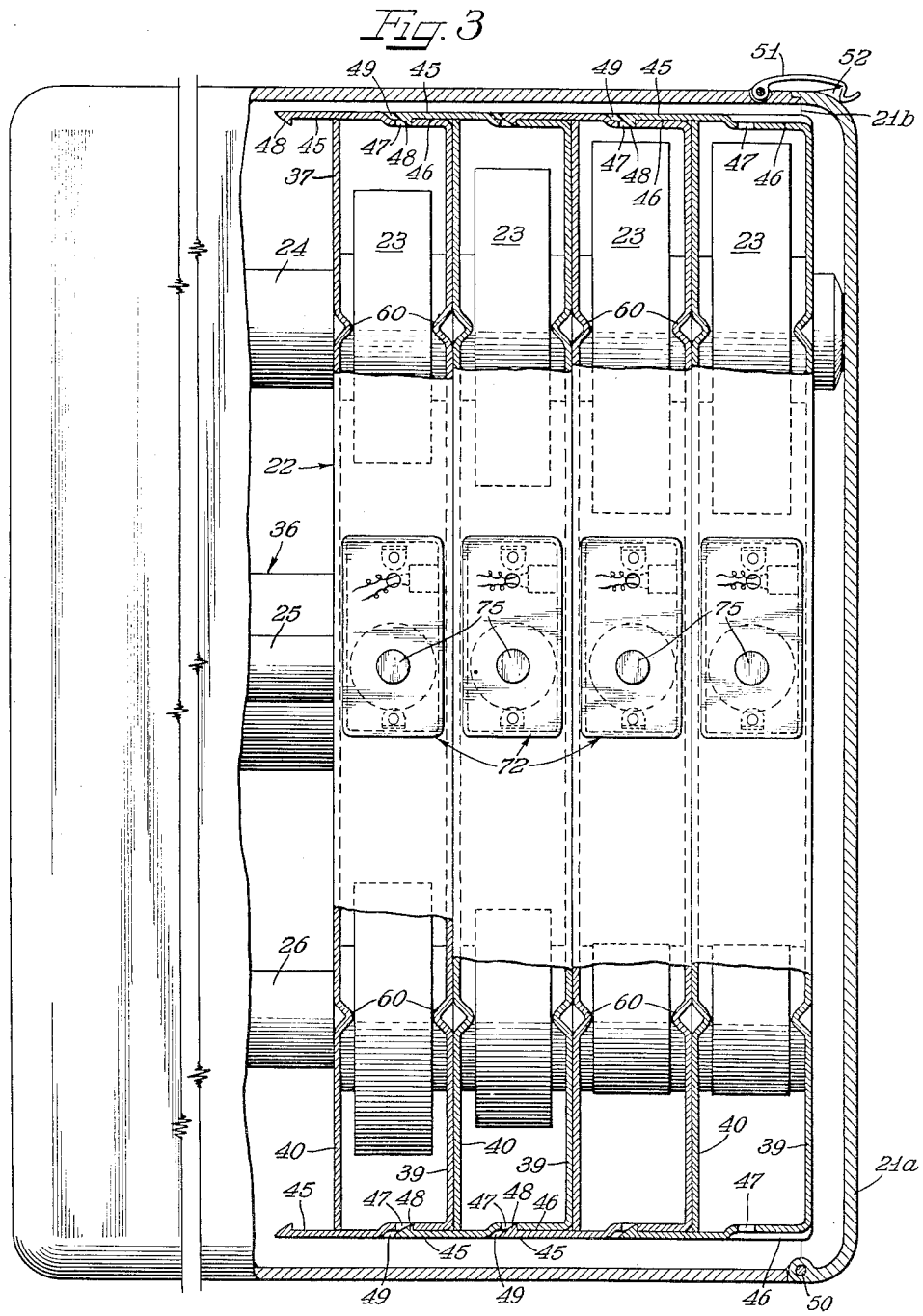

July 17, 1956     M. L. D'ORNELLAS     2,755,030
MULTIPLE TAPE APPARATUS
Filed May 4, 1951     6 Sheets-Sheet 5
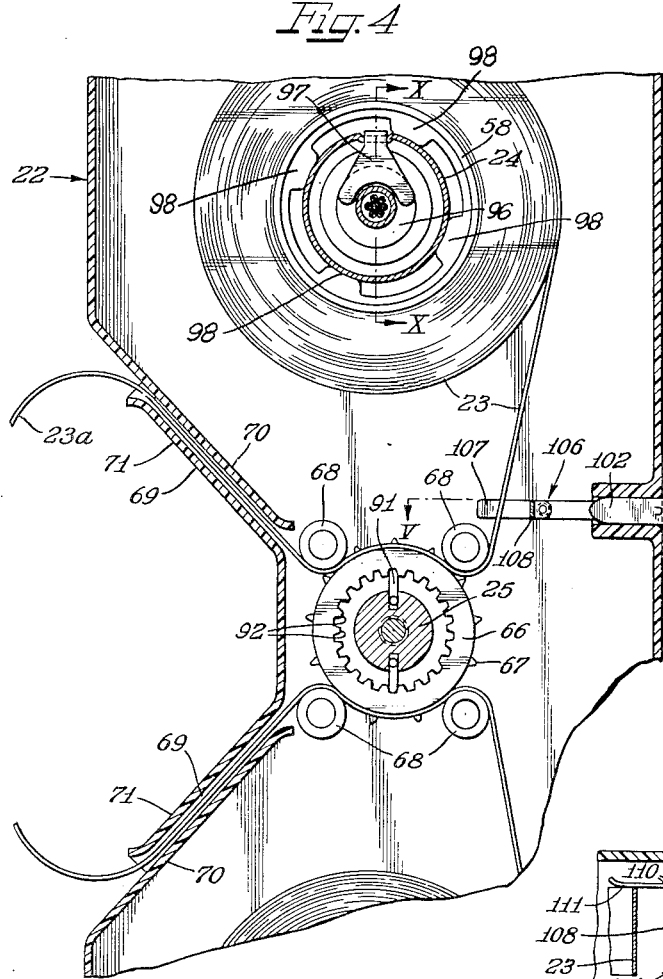
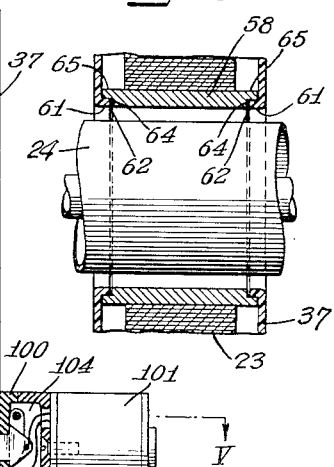
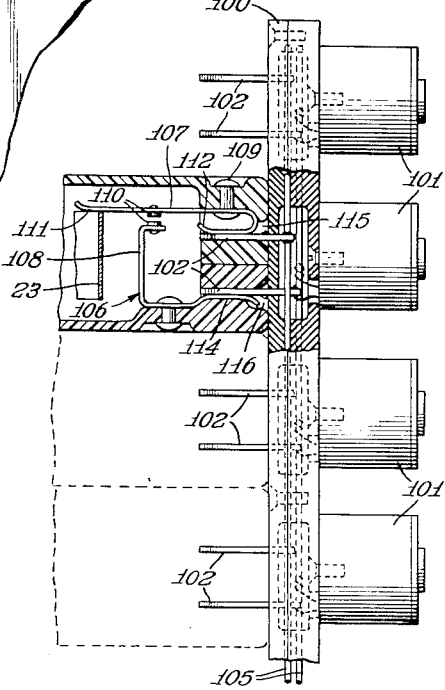
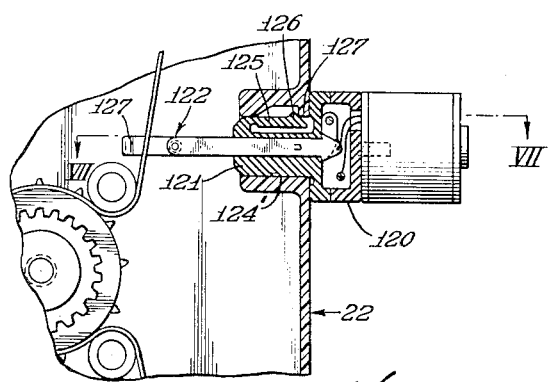
Inventor
Manuel L. d'Ornellas

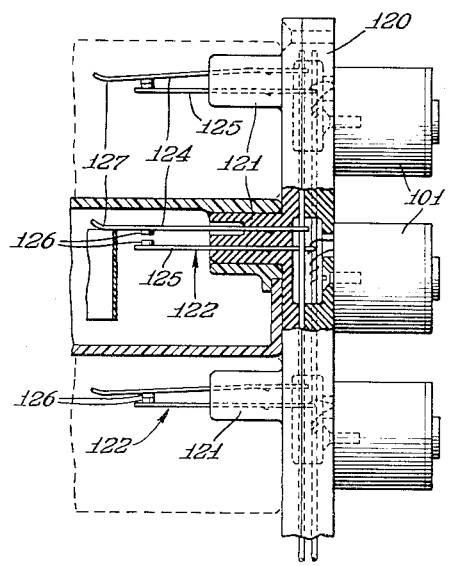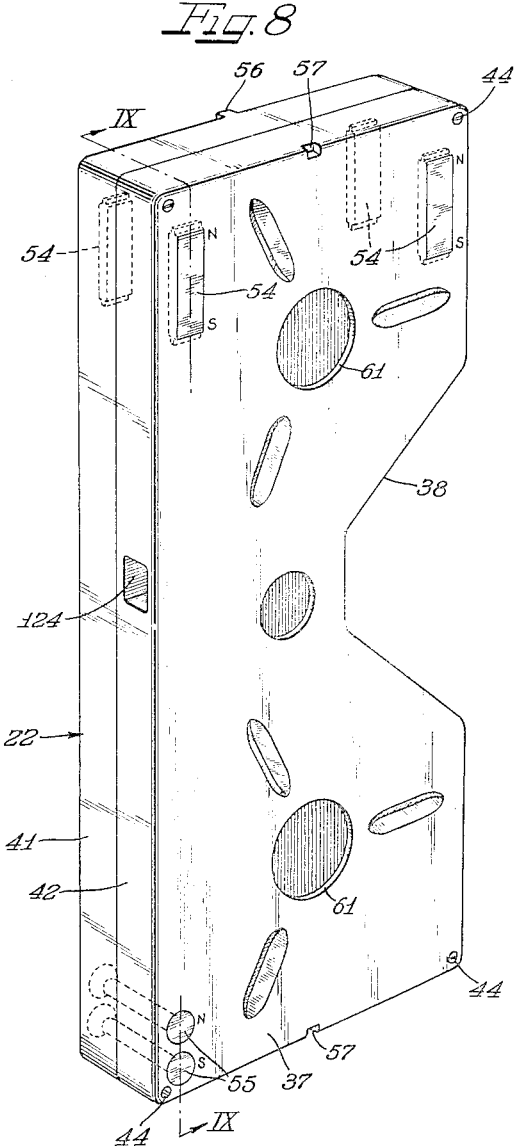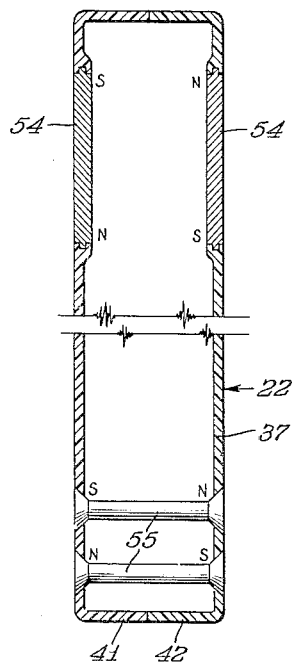

United States Patent Office 2,755,030
Patented July 17, 1956

2,755,030

MULTIPLE TAPE APPARATUS

Manuel L. D'Ornellas, Buenos Aires, Argentina

Application May 4, 1951, Serial No. 224,572

18 Claims. (Cl. 242—55)

This invention relates to improvements in a cinema projector. More particularly, the invention relates to improved multiple film magazines for use with a multi-program cinema projector.

The multiple film magazines of this invention are particularly adapted for use in a multi-program cinema projector such as shown and described in my copending United States patent application for a "Cinema Projector," Serial No. 37,323, filed July 7, 1948, now U. S. Patent No. 2,561,503, issued July 24, 1951, in which a plurality of films are stored in the projector in position for projecting and rewinding in any desired order regardless of the relative position of different films.

While the multiple film magazines of this invention are particularly adaptable for use with a multi-program cinema projector, it will be readily understood from the following description that the principles of the invention are readily adaptable for use in any type of machine utilizing a tape-like medium which travels, during operation of the machine, between a starting position and a rewinding position. Such machines include cinema projectors, sound recorders and amplifiers, data recording machines, and the like. Therefore, the concepts presented hereinafter are not to be restricted for use with the particular cinema projector described.

It is an object of the present invention to provide inexpensively manufactured film containers arranged for expeditious interlocking connection with similar film containers for use in multi-program cinema projectors.

Another object of the invention is to provide improved multiple tape containers for a tape-like medium such as film.

A further object of the invention is to provide improved interlocking means for detachably securing similar multiple tape containers.

Still another object of the present invention is to provide multiple film containers including integral interlock tabs and recesses for detachably securing these containers in abutted relation.

A still further object of the invention is to provide simplified means for detachably securing a plurality of film containers, said means including permanent magnets formed in the respective containers.

Yet another object of the invention is to provide improved plug-in control means for use with multiple film containers.

An additional object of the present invention is to provide separable multiple film containers including plug-in controls connected to a single member to assist in securing the film containers in proper relation.

Another object of the invention is to provide multiple film containers including simplified means for eliminating film reels within the containers.

A specific object of the invention is to provide simplified multiple film containers with interlock means including plug-in controls secured to a single transverse member and with film storage means eliminating the necessity for film reels.

A feature of the present invention is the provision of integral top and bottom interlock flanges and mating recesses on multiple film containers for expeditious attachment and detachment of the containers.

Another feature is the provision of permanent magnets in the sides of multiple film containers for securing the containers in abutted relation.

An additional feature is the provision of a control rail with plug-in controls secured thereto for insertion into abutted multiple film containers for controlling rewinding of the film and assisting in securing the containers together.

A further feature is the provision of integral internal protuberances within the film containers for retaining the film in properly rolled position to preclude the necessity of providing film reels.

Other objects, features and advantages of the present invention will be apparent from the following detailed description of several embodiments, by way of preferred examples, only, as shown on the accompanying drawings.

On the drawings:

Figure 3 is a broken sectional view, with parts in elevation, taken along line III—III of Fig. 2.

Figure 4 is an enlarged fragmentary sectional view of the central portion of one of the film containers as shown in Fig. 2 but including modified plug-in rewind controls.

Figure 5 is a fragmentary sectional view, with parts in elevation, taken along line V—V of Fig. 4 and illustrating the rewind control rail with the plug-in type rewind controls secured thereto.

Figure 6 is a fragmentary sectional view of the plug-in control portion of a film container as shown in Fig. 4 but embodying modified controls.

Figure 7 is a fragmentary sectional view similar to Fig. 5 but taken along line VII—VII of Fig. 6.

Figure 8 is a perspective view of a modified multiple film container including interlock magnets.

Figure 9 is a broken sectional view taken along line IX—IX of Fig. 8.

Figure 10 is a fragmentary sectional view taken along line X—X of Fig. 4 and showing the simplified means for rotatably securing the upper film-receiving spool in the film container.

As shown on the drawings:

Figure 1:
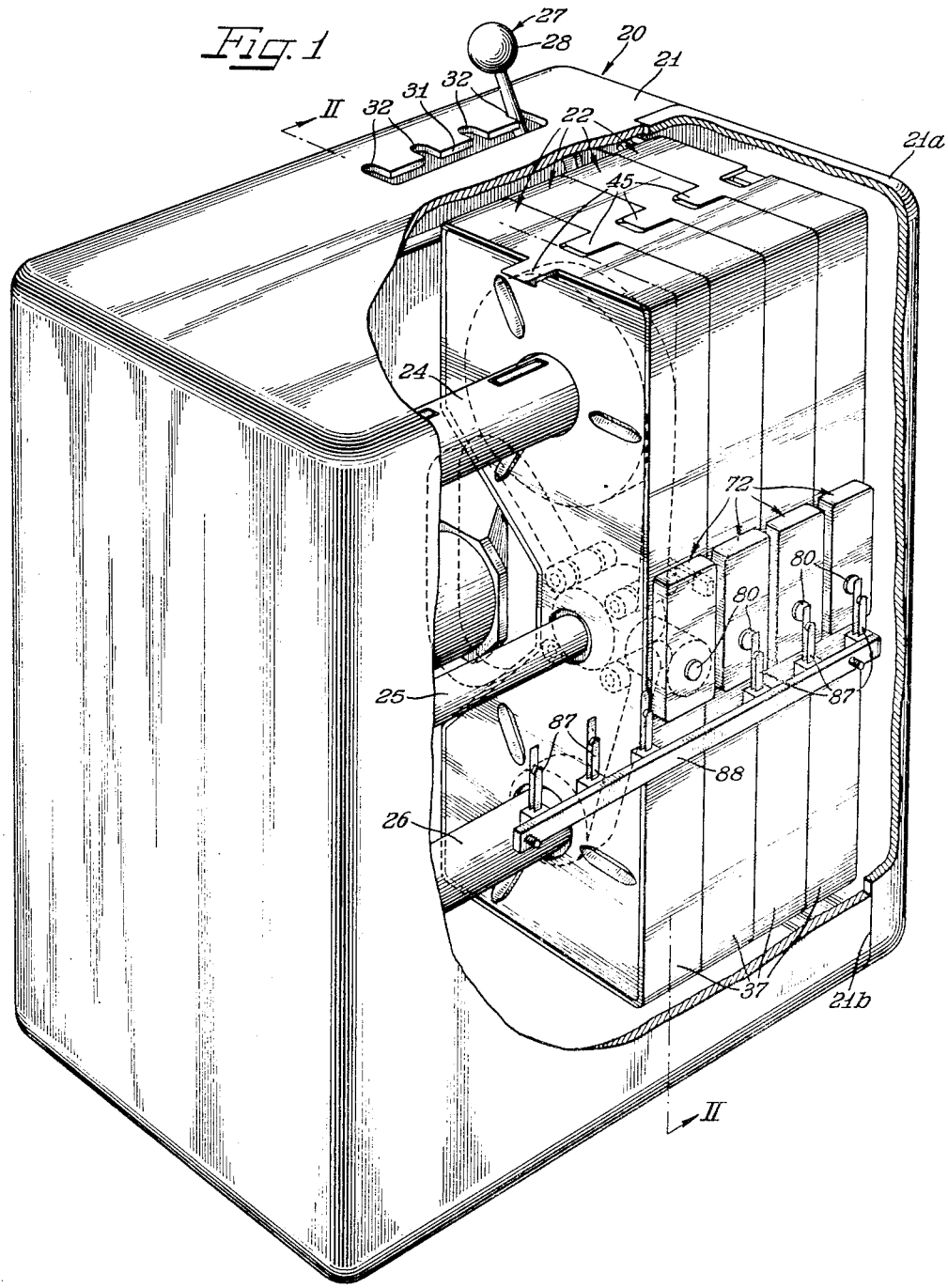
Figure 1 is a perspective view of a multi-program cinema projector with a portion of the casing cut away to show a plurality of film containers disposed therein for projecting and rewinding of the film stored in the containers.

In Figure 1 is illustrated a multi-program movie or cinema projector 20 such as that shown and described in my copending patent application cited above, and including a casing 21 with a removable access opening cover 21a provided over an access opening 21b. A plurality of multiple film containers 22 are disposed therein and are operatively mounted on an upper rotatable rewind shaft 24, a central rotatable film drive shaft 25 and a lower rotatable film take-up shaft 26. A tape or film 23 is stored in each of the containers 22 and a closed film loop 23a extends out of the front edge panel of each container.

Figure 2:
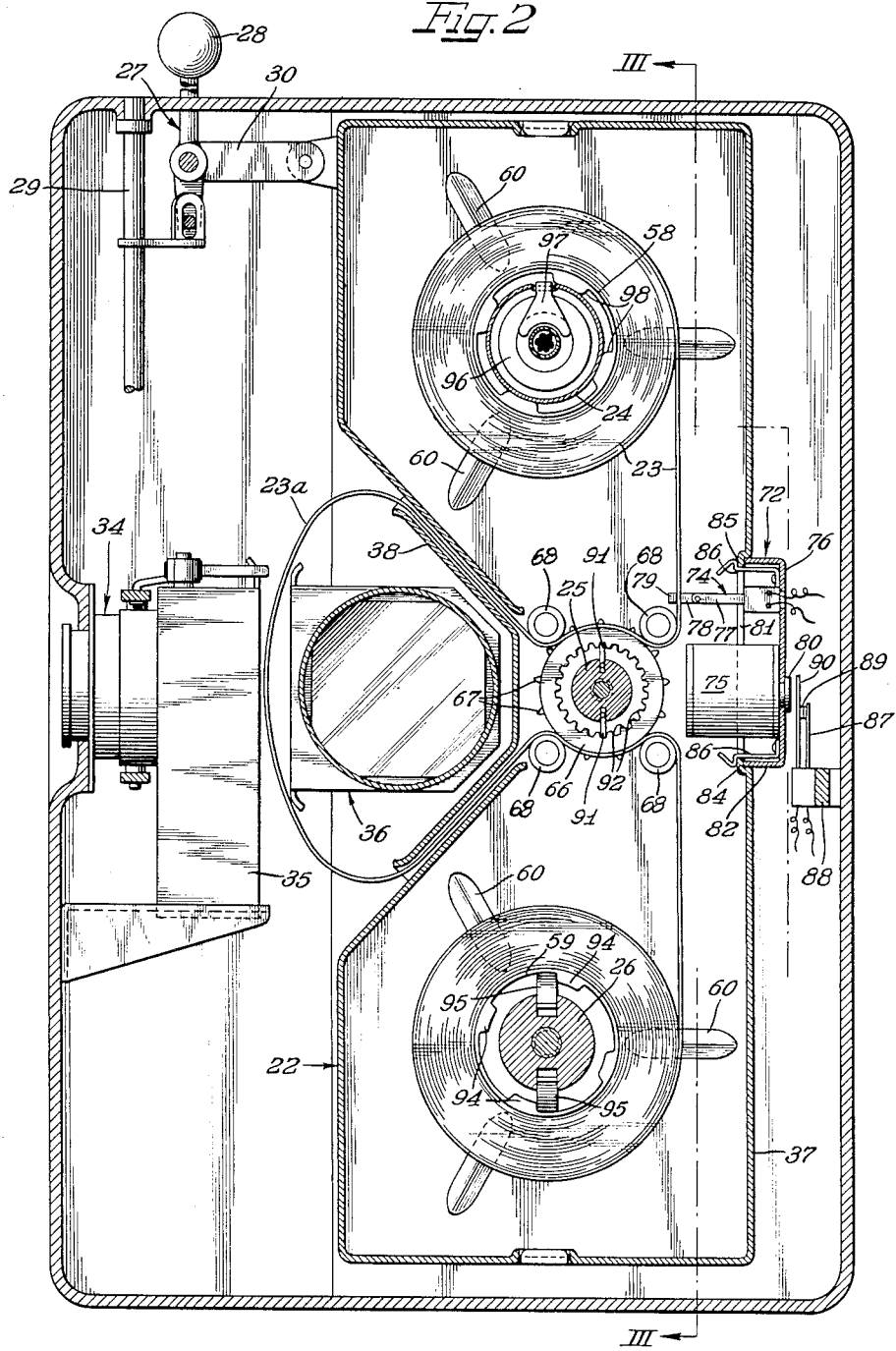
Figure 2 is a sectional view, with parts in elevation, taken along line II—II of Fig. 1 and showing the interior of the cinema projector casing and the interior of one of the multiple film containers.

Film-container shifting or indexing means 27 are provided for shifting any of the multiple film containers 22 into projecting position, the position occupied by the film container located farthest to the left as shown in Fig. 1. The indexing means 27 include a manually operable lever or handle 28, a vertical support rod 29 and a pivotally mounted shifting arm 30 connected between the handle 28 and the film containers 22 (Fig. 2). The cinema projector casing 21 has an upper indexing cut-out 31 including a plurality of index notches or positions 32 for receiving the shank portion of the handle 28 with each of the index positions 32 corresponding to projecting position for one of the multiple film containers 22.

A projecting assembly 34 is disposed in the projector casing 21 (Fig. 2) and contains a slidably mounted portion 35 including film claw means (not shown) for engaging standard perforations in the side edge portions of the film for intermittently driving the film past the lens assembly. The slidable portion 35 moves forwardly in response to movements of the indexing handle 28 to disengage the lens assembly 34 from a stationary film-receiving and light-refracting assembly 36 in order to permit unimpeded shifting of the film containers 22.

For a considerably more detailed description of the construction and operation of a multi-program cinema projector with which the improved multiple film containers of the present invention are particularly adapted for use, reference is again made to applicant's above-cited copending patent application.

Each of the film containers 22 of the present invention comprises a box-like housing or casing 37 of flat, closed rectangular configuration with a central edge cut-out or recess 38 providing clearance for sliding past the film-receiving assembly 36. The housing 37 may be expeditiously formed of molded plastic or the like in two sections, a dished tray portion 39 and a substantially flat cover portion 40 as shown in Fig. 3 or in two opposite shallow dished tray portions 41 and 42 as shown in Figs. 8 and 9. The two separable portions of the housing 37 in either form, are fixedly secured by any suitable attachment means as by screws 44 shown in Fig. 8.

As shown in Figs. 1–3 mechanical interlock means are provided for detachably securing a plurality of containers 22 in abutted relation for inserting as a unit into the projector casing 21. Herein such means comprise integral perpendicularly extending interlock tabs or fingers 45 extending perpendicularly outwardly from the top and bottom edge portions of the housing 37. Corresponding interlock grooves or recesses 46 are formed in the upper and lower edge panels of the housings 37 opposite to the tabs 45 for receiving the tabs of an adjacent container in substantially conforming relation therein. Locking apertures 47 (Fig. 3) are formed through the end panels of the housing 37 at the inward end portions of the recesses 46 for receiving a locking tooth or projection 48 of each of the interlock tabs 45. It will be noted that the inward defining face of each of the teeth 48 is substantially perpendicular to the corresponding tab 45 for positive locking engagement with one defining edge portion of each of the locking apertures 47 while the outward defining edge portion of each of the teeth 48 is slanted at an acuate angle to the tabs 45 to permit easy sliding of the tabs into the recesses 46. A disengagement access space 49 is provided between the end of each of the tabs 45 and the inward ends of the recesses 46 to allow for manual disengagement of the teeth 48 by outward deflection of the tab free end portions. Thus, it will be seen that any number of multiple film containers 22, up to the capacity of the projector, may be held in detachable aligned abutted relation for insertion into the cinema projector casing 21.

As best seen in Fig. 3, the nested film containers 22 can be inserted through the projector casing aperture 21b, and the cover 21a may be removably secured over the opening by means of a lower hinge 50 and an upper spring snap 51 which detachably engages a lock projection 52 formed at the upper end portion of the cover.

An alternative form of film container engagement means is shown in Figs. 8 and 9. In this embodiment of the invention the mating interlock tabs and recesses are replaced by permanent magnets embedded in the material of the casings 37, herein shown as upper bar magnets 54 and lower rivet type magnets 55. The polarity of each of the magnets is indicated by the letters "N" indicating north and "S" indicating south. As shown on the drawings, two upper bar magnets 54 are embedded in spaced relation in the material of one side of each of the casings 37 with the north poles of these magnets at the top. On the other side of each of the casings 37 two bar magnets 54 are embedded in the material of the magazines in corresponding position to the magnets on the opposite sides but with the south poles at the top.

Each of the lower rivet magnets 55 extends between the two sides of each of the casings 37 with one of the magnets in spaced relation above the other near the rearward edge portions of the casings. The north pole of one of the magnets is in one side of the casing and the south pole is at the other side while the polarity of the other rivet magnet is reversed. The magnets 54 and 55 may be formed of any satisfactory permanent magnet material such as "alnico."

Thus, it can be readily seen that when two or more of the containers 22 are placed in abutted side-by-side relation the magnets 54 and 55 of one of the containers will coact with the magnets of the adjacent containers to hold the same in proper relation. In order to eliminate any danger of slippage between the two abutted containers integral projections 56 may be provided at the upper and lower edge portions of each of the containers for mating with notches 57 in corresponding positions at the other sides of each of the containers.

The film 23 is stored in each of the containers 22 on an upper spool 58 and a lower spool 59, which may be of plastic, with the respective opposite portions of the film rolled thereabout in the conventional manner (Figs. 2 and 4). The spools 58 and 59 have no side flanges as in the case with conventional film reels in movie projectors and may be economically formed from molded plastic or the like. Instead of providing side flanges a plurality of internal protuberances or ribs 60 are formed inwardly from the inward facing surface of both sides of each of the containers 22 and extend radially outwardly from each of the spools 58 and 59 to cover substantially the entire edge areas of the films when the same are fully wound about one or the other of the spools. Thus, the ribs 60 act as spacing means to center the film 23 within the containers 22 for preventing excessive friction between the film edges and the sides of the containers and for preventing injury to the edges of the film. The ribs 60 also insure rolling of the film in an even manner with the edges in coplanar convolutions to prevent kinking and the like. As best seen in Figures 3 and 8, the ribs 60 can be easily formed by pressing the sides of the containers inwardly in the proper position during the molding process or thereafter. Alternately, the ribs could be molded in solid form.

The means for rotatably securing the spools within the containers are best shown in Figure 10 wherein a pair of aligned circular apertures 61 are formed through the sides of the casings 37 in the upper and lower portion of each of the casings with only the upper apertures illustrated in Figure 10, the lower apertures being similar. It will be noted that the shafts 24 and 26 can be inserted through the respective upper and lower apertures. Short integral inwardly extending annular bearing flanges 62 are formed about each of the apertures 61 and are disposed in bearing relation in opposite end recesses 64 formed in the spools 58 and 59. Annular outer recess defining rims 65 of each of the spools are disposed radially outwardly about each of the flanges 62. Hence, the spools 58 and 59 are securely held within the casings 37 and are arranged for free rotation therein.

Drive means are provided for driving the film from one of the reels in one of the containers to the other reel and vice versa. Such drive means comprise a drive roll or sprocket 66 having peripherally spaced integral engagement teeth 67 and four film rollers 68, with the sprocket and the rollers rotatably retained in each of the casings 37 in spaced relation between the film spools 58 and 59. The films 23 are provided with conventional perforations (not shown) which are engaged by the sprocket teeth 67 so that upper and lower peripheral portions of the sprockets 66 move abutted portions of the films 23 in opposite direction to unwind the films from one of the spools in each casing and to propel the unwound film toward the other spool. The rollers 68 are provided to hold the two abutted portions of each of the films against the peripheries of the sprockets.

The loops of film 23a are formed between the two portions of each of the films contacting the sprockets 66. The loops 23a lie outside of the containers 22 outwardly of the container cutouts 38 with the films traveling through a pair of guide slots 69 formed by two spaced overlapped integral flanges 70 and 71 formed at opposite sides of each of the container cut-outs 38.

It will be readily understood that the film loop 23a is the portion of the film which is disposed between the lens assembly 34 and the refractor assembly 36 when the particular container 22 is in projecting position.

Figure 2B:
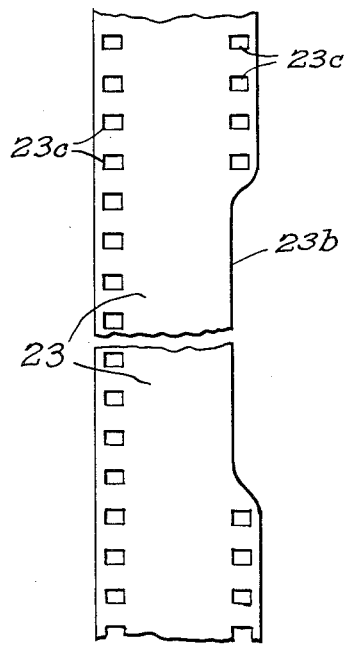
Figure 2B is a diagrammatic view illustrating an actuating recess in a side edge of the film for actuating the feeler switch of Figure 2A.
Figure 2A:
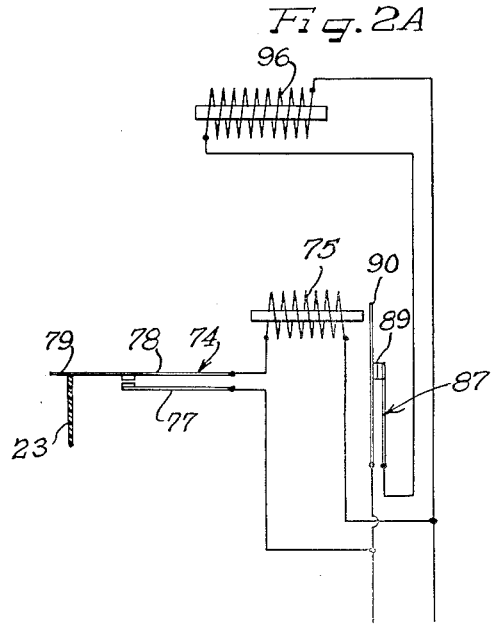
Figure 2A is a diagrammatic illustration of the electric circuit associated with the structure of Figure 2.

According to the present invention, removable means are provided for controlling rewinding of the film in any of the containers 22 from the lower spool 59 to the upper spool 58. Herein such means comprise a rewind control assembly 72 for each of the containers as shown in Figures 1–3. Each of the control assemblies 72 includes a film edge feeler or cam switch 74 (Fig. 2) and a rewind cut-off electric magnet or relay 75, with the switch 74 controlling electrical current flow to the relay 75, as indicated in Figure 2A. The switch 74 is fixedly secured to a cap 76 and has a pair of arms 77 and 78 in opposed spaced relation with a pair of contact points (not shown) connected to the free end of the arm 77 and a point opposite thereto on the arm 78. The arms are of resilient material such as spring steel and normally urge the contact points to closed position.

An integral feeler or cam finger 79 is formed at the free end of the arm 78 outwardly of the contact points and engages the side edge of the film 23 in such a manner that the arm 78 is urged away from the arm 77 so that the contact points are in an open position. A side edge recess or notch 23b, Figure 2B, is formed in the side edge of the film 23 which contacts the cam finger 79 in a position near the beginning portion of the film so that the cam finger 79, when engaged in the film recess, will move into normal position closing the contact points to allow electric current to energize the connected relay 75.

The relay 75 is also fixedly secured to the cap 76 and has one pole of the electric magnet therein extending through the wall of the cap to form a button 80 which is magnetically energized when the contact points of the switch 74 are closed.

The caps 76 cover an aperture 81 in the rearward edge panel of each of the containers 22 and have integral forwardly extending edge flanges 82 with their ends retained in an aperture surrounding recess 84 formed by means of an integral offset flange 85 formed around each of the apertures 81.

In order to fixedly secure the rewind control assembly to the film container 22 a pair of snap catches 86 are fixedly secured at one end to the caps 76 and have engagement portions at their free ends detachably engaged with the defining flanges 85.

A plurality of rewind cut-off switches 87 are fixedly secured in spaced relation to a single switch rail 88 in positions corresponding to all of the possible positions of any of the film containers 22 except the projecting position. Each of the switches 87 has a pair of spring pressed contact points 89 normally in contact and an arm 90 in position for attraction by one of the relays 75 to break contact between the points 89.

Referring to Figure 2, when one of the containers 22 is in projecting position, engagement arms 91 on the drive shaft 25 engage with internal teeth 92 formed in the drive sprocket 66 to rotate the drive sprocket in response to rotation of the shaft 25.

Each of the spools 59 is provided with internal protuberances 94 which are engaged by engagement members 95 when the corresponding film container 22 is in projecting position so that the spool 57 is rotated in response to rotation of the shaft 26.

In operation, the movement of the shafts 25 and 26 and the film claw mechanism in the lens assembly portion 35 are coordinated to allow proper projection of the film. When a film container 22 which has had its film 23 projected is shifted into any one of the non-projecting positions, the shaft 25 is disengaged from sprocket 66 and the shaft 26 is disengaged from the sprocket 59, and in addition, the film loop 23a is no longer retained between the film-receiving assembly 36 and the lens assembly 34. However, when the film container is moved to one of the non-projecting positions, the breaker points of the switch 74 are in the open position so that the relay 75 is not actuated. Therefore, the corresponding breaker points 89 remain closed and a magnet 96, which is electrically connected to the breaker points 89 as indicated in Figure 2A, is energized causing a spring lock 97 to engage with one of a plurality of inwardly formed protuberances 98 formed in the interior of the corresponding upper spool 58 so that the spool 58 rotates in response to rotation of the shaft 24 to cause rewinding of the film 23 onto the upper spool.

The shaft 24 is provided with a plurality of magnets 96 and spring locks 97 to correspond to all possible positions of the containers 22 except for the projecting positions.

When the film 23 has been rewound, the film edge recess is engaged by the cam finger 79 of the switch 74 to close the breaker points and to energize the relay 75. This causes attraction of the end portion of the arm 90 of the switch 87 against the relay button 80 to break the contact points 89 to cut-off the current supply to the corresponding magnet 96 which disengages the shaft 24 from the corresponding upper spool 58. Hence, the film in this particular container 22 is now in position for re-projecting when the corresponding container is moved to projecting position.

The operation of the cinema projector is set out in detail in my above cited copending application.

Figure 5A:
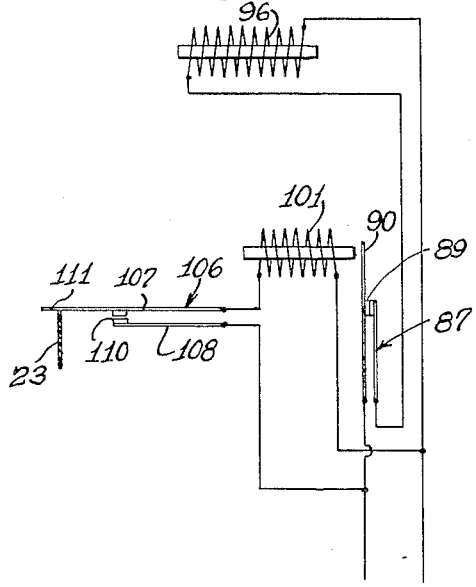
Figure 5A is a diagrammatic illustration of the electric circuit associated with the structure of Figure 5.

In accordance with the concepts of the present invention, means are provided for controlling the rewinding operation while, at the same time, providing additional connection means between the abutted containers. This is accomplished by the provision of a transversely extending rewind control member such as a rail 100 (Figs. 4 and 5), of plastic material or the like, with a plurality of relays 101 affixed thereto in spaced relation. The relays 101 are respectively connected to sets of two prong electrical plugs 102 affixed on opposite sides of the rail 100 in corresponding position to each of the relays. The respective sets of prongs and relays are connected in parallel across two power supply lines 105.

The rail 100 may be of a two-piece construction as shown with an interior hollow 104 adjacent each of the sets of relays and prongs, or the prongs and the relays can be molded into the positions shown in a solid molded rail.

The containers 22, arranged for connection to the control rail 100, are each provided with a film edge feeler switch 106 having a resilient arm 107 and a perpendicularly extending arm 108 fixedly secured to the rear edge portion of the container as by rivets 109. A breaker point 110 is fixedly secured to each of the arms and a cam feeler finger 111 extends outwardly of the breaker point on the arm 107 to engage the edge portion of the film 23. The switch 106 operates in the same manner as the switch 74.

In order to provide electrical connection between the switch 106 and the prongs 102, resilient rearward portions or tabs 112 and 114 of the respective arms 107 and 108 are disposed in the respective prong-receiving apertures 115 and 116 formed through the rearward edge portion of the container 22, and when a set of the prongs 102 is inserted into the apertures 115 and 116, the spring portions 112 and 114 are moved aside. Hence, the switch 106 is electrically connected through the prongs 102 to the corresponding relay 101 as indicated diagrammatically in Figure 5A, and the operation is the same as described in connection with Figures 1–3.

Furthermore, it will be evident that the prongs 102 serve to retain the rearward portions of the connected containers 22 in proper position. One or more of the containers can be connected to the rail 100 for projecting and rewinding in the cinema projector. The film containers 22 connected to the rail 100 may be provided with interlocking or connection means as described hereinabove or may be utilized without such means since the prongs 102 will serve to adequately hold the containers in place in most instances.

Figure 7A:
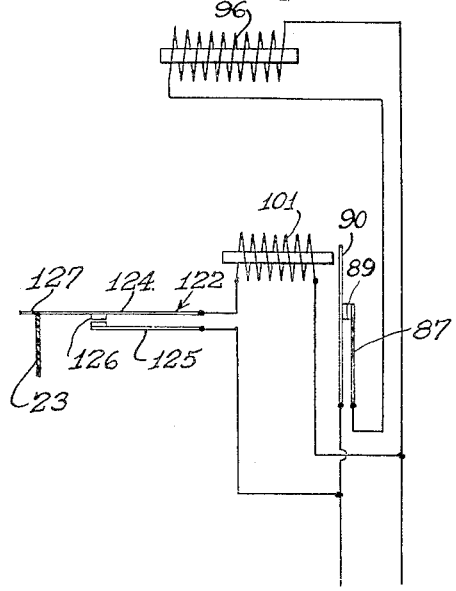
Figure 7A is a diagrammatic view illustrating the electric circuit associated with the structure of Figure 7.

A modified type of plug-in control means is illustrated in Figures 6 and 7. As shown in these figures, a single transversely extending control member such as a rail 120 has a plurality of relays 101 fixedly secured thereto as to the rail 100. Opposite each of the relays 101 an integral projection 121 extends from the rail 120 and has a feeler switch 122 extending therethrough in fixed relation. The switch 122 comprises two arms 124 and 125 similar to those of the switch 74 and provided with breaker points 126 and a cam finger 127. The switches 122 are electrically connected to the respective relays 101. The operation of the switches 122 and the relays 101 is illustrated diagrammatically in Figure 7A and is exactly the same as described in connection with the previous embodiments.

For detachably securing the rail 120 with modified containers 22, the modified containers are provided with rear edge portion apertures 124' for receiving the projections 121 therein. A rearwardly extending integral resilient flange 125 is provided on the projection 121 and has an end enlargement 126 for snap engagement with a downwardly extending integral locking flange 127 in the aperture 124. Thus, a detachable snap engagement is provided between the containers 22 and the rail 120, and one or more containers can be snapped onto the rail 120 for use in the cinema projector. As is the case in the embodiment as illustrated in Figures 4 and 5, the containers in this embodiment may be utilized with or without auxiliary interlock means as described in connection with Figures 1–3.

It will be readily understood that the rail 120 can be of a two-piece construction as shown in the figures or may be molded in one piece to retain the switches 122 and the relays 101 in the proper position.

Either of the embodiments of Figures 4 and 5, or Figures 6 and 7 may be utilized in the cinema projector as illustrated in Figures 1–3.

From the above description it will be readily understood that the present invention provides improved multi-type film containers for use in a multi-program cinema projector. The individual containers can be efficiently formed from molded plastic or the like and may be provided with interlocking means such as tabs and lock recesses or coacting imbedded permanent magnets. Simplified film-receiving spools are provided, and these spools are utilized without side flanges by the provision of internal ribs for guiding and protecting the film within the containers. Improved rewind plug-in controls are provided and may be of either of the separable type or of the integral rail type with the rail and control support serving to retain the containers in proper relation. In the rail-type of plug and control means the feeler switches may be fixedly secured either in the containers or in the rail.

The term "projecting" will be used in the claims as generic to reproduction from motion picture film, and recording and reproduction from magnetic record media and other tape-like media. The term "projecting position" would thus refer to a position of the tape where it was associated with a magnetic recording or reproducing head, or the like.

It will be understood that modifications and variations may be effected without departing from the scope of the novel concepts of the present invention.

I claim as my invention:

1. In a multiple tape apparatus, a plurality of containers mounted in said multiple tape apparatus for movement between a plurality of non-projecting positions and a projecting position, means for shifting said containers as a unit in the multiple tape apparatus, a spool of tape rotatably supported in each of said containers, a second spool rotatably supported in each of said containers, a rotatable shaft inserted through each of said containers through the first named spools therein, means for selectively transferring said tape from said first named spool to said second spool in a selected container while the container is in projecting position for projecting the tape, and automatic means including said rotatable shaft and individual clutch means at each of said non-projecting positions for rewinding a previously projected tape onto the respective first named spool when the corresponding container is out of projecting position, said automatic means including individual rewind switch controls inserted into each of said containers and movable therewith, and individual stationary switch means disposed for cooperation with said individual rewind controls in non-projecting positions thereof and connected respectively with said individual clutch means for controlling rewinding in the containers in the respective non-projecting positions.

2. In a multiple tape apparatus having a plurality of separable tape containers, a spool of tape rotatably mounted in each of said containers, a second spool rotatably mounted in each of said containers, a rotatable shaft on which said containers are mounted in said apparatus for moving between a projecting position and non-projecting position, means to shift said containers as a unit in the apparatus to bring a selected tape into projecting position, and automatic means including said rotatable shaft to rewind a previously projected tape onto the respective first named spool when the corresponding container is out of projecting position, the improvement characterized by said automatic means including an elongated control rail and a plurality of individual rewind controls fixedly secured in spaced relation on said rail, said controls being plugged into the respective containers to retain the same in abutted aligned relation and to control said automatic means.

3. In a projector having a casing including a power driven rotatable shaft with a plurality of spaced electrically actuated clutches associated therewith, a plurality of film containers slidably mounted in said casing, means detachably securing said containers in aligned abutted relation, two film spools rotatably mounted in spaced relation in each of said containers with said shaft extending through one of the spools in each container, a film in each of said containers connected in reeling relation to the film spools, said film having an edge recess near one end thereof, means for shifting said containers as a unit in the projector to bring a selected film into projected position, the improvement characterized by an elongated control rail having a plurality of individual rewind controls secured in spaced relation on the rail, said rewind controls including a relay and a film edge feeler switch associated with each container and with the switch electrically connected to said relay and adapted to energize the same when the switch is engaged in said film edge recess, rewind cut-off switches in position for cut-off actuation by the respective relays of each container except the container in projecting position, and means electrically connecting said cut-off switches to the respective clutches for energizing the same to mechanically connect said shaft to an associated spool in a container which has had its film projected.

4. In a multiple tape apparatus having a casing including therein a power driven rotatable shaft with a plurality of spaced clutches associated with the shaft, a plurality of tape containers slidably mounted in said casing, elements on each of said containers for retaining the same in aligned abutted relation, tape receiving spools rotatably supported in each container with said shaft extending through the containers and through one of the spools in each container, a tape in each of said containers connected in reeling relation to the tape spools, mechanism for shifting the containers as a unit for placing any selected container in position for projecting the tape therein, the improvement characterized by a transverse control rail, a plurality of individual rewind controls secured in spaced relation on said rail, means operatively connecting said rewind controls to said clutches for selectively actuating the same, said controls being plugged into the respective containers for additionally retaining the same in abutted aligned relation.

5. In a multiple tape apparatus having a plurality of separable tape containers, a first reel containing tape to be projected in each container, means rotatably mounting said reels in said containers, a second reel in each of said containers, means rotatably mounting said second reel in spaced relation to said first reel, a drive sprocket in each of said containers, means rotatably mounting said drive sprockets in said containers in spaced relation to said spools, said drive sprockets receiving tape from said first named spools to deliver the tape to said second named spools, a shaft in said apparatus extending through each of said containers and each of said first named reels, means for rotating said shaft, means for shifting said tape containers axially of said shaft to shift the tape into and out of projecting position, means for driving one of said sprockets when the associated tape is in projecting position, individually operable clutches associated with said shaft for selectively engaging said first named reels in any of said containers out of projecting position, the improvement characterized by a transverse control member, a plurality of individual rewind controls secured in spaced relation on said member, and means operatively connecting said rewind controls to said clutches, said controls being plugged into the respective containers to retain the same in abutted aligned relationship.

6. In a multiple tape apparatus having a plurality of tape containers slidably mounted therein, a pair of tape spools rotatably mounted in spaced relation in each of said containers, a tape wound about the spools and extended threbetween in reeling relation, means for shifting said containers selectively into and out of tape projecting position, individually operable mechanisms for rewinding a previously projected tape in any of said containers out of projecting position, the improvement characterized by a transverse rewind control member, a plurality of individual rewind controls associated with said member in spaced relation therealong, means operatively connecting said rewind controls to said mechanisms, said controls having portions projecting transversely of said member and inserted into said containers for retaining the same in aligned abutted relation.

7. In a multi-program tape apparatus including a plurality of separable tape containers, a rewind control member comprising a body portion, a plurality of relays secured thereto in spaced relation, a plurality of electrical connector plugs secured to said member opposite the respective relays, means electrically connecting the respective relays to the opposite plugs, each of said containers including a rewind switch therein, said plugs being insertable into the respective containers for electrically connecting said switches to said relays and retaining said containers in abutted spaced relation.

8. In a multi-program apparatus including a plurality of separable tape containers, a rewind control member comprising a body portion, a plurality of relays secured to said body portion in spaced relation, said member having a plurality of projections extending oppositely from each of said relays, a rewind control switch having portions secured in each of said projections, means electrically connecting said relays to the respective rewind control swtiches, said projections and the unconnected portions of said swtiches extending into the respective containers and retaining the same in abutted aligned relation.

9. In a multiple tape appartus including a plurality of separable tape containers with a tape operatively retained in each of the containers, a rewind control rail having a body portion, a plurality of relays fixedly secured to said rail in spaced relation therealong, a plurality of two-prong plugs secured to said rail with one set opposite each relay, means electrically connecting said plugs to said relays, each of said tape containers having a tape edge feeler switch secured therein with a portion operatively engaging the edge of the associated tape, said plugs being inserted into the respective tape containers and retaining the same in aligned relation, said feeler switches including resilient tabs engaging the respective plug prongs for electrically connecting the switches to the associated relays and frictionally retaining said prongs in said containers.

10. In a multi-program tape apparatus including a plurality of tape containers with tape operatively retained therein, a rewind control rail having a body portion, a plurality of relays secured to said body portion in spaced relation therealong, projections extending transversely of said rail and oppositely of the respective relays, a tape edge feeler switch having portions secured in said projections, means electrically connecting said switches to the respective relays, each of said containers having an aperture therein for receiving the respective rail projections in substantially conforming relation and an integral engagement flange extending into each of said apertures, each of said rail projections having a resilient engagement flange thereon engaging said container flanges for detachably securing the respective projections in said apertures, and said tape edge feeler switches operatively engaging the edge portions of said tape in each of the containers.

11. In a tape reeling apparatus, a container for accommodating a pair of spools therein, a rewind control assembly detachably connected to said container for movement therewith, stationary electric circuit means disposed for cooperation with said rewind control assembly in one position of said container, and means for shifting said container with said rewind control assembly relative to said stationary electric circuit means in said apparatus.

12. In a reeling apparatus, a container adapted to have a pair of spools rotatably mounted in spaced relation therein for transfer of an elongated medium from one spool to the other, a rewind control assembly detachably connected to said container and including means extending into said container and cooperating with said elongated medium to control rewinding thereof, stationary electric circuit means for cooperation with said rewind control assembly in one position of said container, and means for shifting said container with its rewind control assembly connected therewith relative to said stationary electric circuit means.

13. In a multiple tape reeling apparatus, a pair of spaced shafts, a plurality of containers having aligned apertures therethrough receiving said shafts, a spool of tape rotatably supported in each of said containers and receiving a first one of said shafts therethrough, a second spool rotatably supported in each of said containers and receiving a second one of said shafts therethrough, said containers being disposed in aligned abutting serial relation to each other along said shafts, and locking elements on each container for detachably securing the containers to each other in abutting aligned relation, and means for shifting said containers axially of said shafts as a unit in said apparatus.

14. In a multiple tape reeling apparatus having a pair of spaced generally parallel shafts, a plurality of separable containers having aligned apertures receiving the respective shafts, a first spool rotatably mounted in each of said containers and receiving a first one of said shafts therethrough, a second spool rotatably mounted in each of said containers and receiving a second one of said shafts therethrough, and means for shifting said containers as a unit in the apparatus, the improvement characterized by an integral transversely extending interlock tab formed at the top and bottom of each container, each of said containers having an interlock groove at the top and bottom thereof opposite said tabs for receiving the tabs of the next adjacent container in substantially interlocking relation, said tabs and grooves serving to interlock said containers in abutted aligned relation for transfer as a unit in said apparatus.

15. In a multiple tape reeling apparatus having a pair of spaced generally parallel shafts, a plurality of separable containers having aligned apertures receiving the respective shafts, a first spool rotatably mounted in each of said containers and receiving a first one of said shafts therethrough, a second spool rotatably mounted in each of said containers and receiving a second one of said shafts therethrough, and means for shifting said containers as a unit in the apparatus, the improvement characterized by an integral transversely extending interlock tab formed at the top and bottom of each of said containers, each of said tabs having a longitudinally inwardly extending integral end tooth, each of said containers having an interlock recess opposite each of said tabs for receiving the same in substantially conforming interlocked relation, each of said containers having a tooth receiving aperture adjacent the inner end portion of each of said interlock recesses for receiving the respective teeth therein to detachably secure the containers to one another in abutted aligned relation.

16. In a multiple tape reeling apparatus having a pair of spaced generally parallel shafts, a plurality of separable containers having aligned apertures receiving the respective shafts, a first spool rotatably mounted in each of said containers and receiving a first one of said shafts therethrough, a second spool rotatably mounted in each of said containers and receiving a second one of said shafts therethrough, and means for shifting said containers as a unit in the apparatus, the improvement characterized by interlock means carried at the top and bottom of each of said containers at each side thereof for cooperation to secure said containers in aligned abutted relation.

17. In a tape reeling apparatus, including a housing and drive means carried by said housing, a container for accommodating a pair of rotatable spools therein and for receiving said drive means in driving relation to one of said spools when said container is mounted on said housing, and a rewind control assembly for controlling said drive means and including a member for detachable connection to said container, and said container together with the rewind control member detachably connected therewith being bodily shiftable relative to said drive means while mounted on said housing.

18. Apparatus according to claim 16 wherein at least some of said interlocked means comprise permanent magnets operable to secure the containers in aligned abutted relation.

References Cited in the file of this patent

UNITED STATES PATENTS

| | | |
|---|---|---|
| 1,313,733 | Ramsher | Aug. 19, 1919 |
| 1,336,640 | Leonard | Apr. 13, 1920 |
| 1,871,235 | Proctor et al. | Aug. 9, 1932 |
| 1,936,043 | Thomas | Nov. 21, 1933 |
| 1,984,111 | Bouveng | Dec. 11, 1934 |
| 2,096,445 | Begun | Oct. 19, 1937 |
| 2,135,401 | Kiff | Nov. 1, 1938 |
| 2,198,106 | Chandonia | Apr. 23, 1940 |
| 2,214,468 | Lannerd | Sept. 10, 1940 |
| 2,252,272 | Otto | Aug. 12, 1941 |
| 2,379,690 | Cunningham | July 3, 1945 |
| 2,384,637 | Owens | Sept. 11, 1945 |
| 2,513,423 | Owens | July 4, 1950 |
| 2,539,521 | Owens | Jan. 30, 1951 |
| 2,561,503 | D'Ornellas | July 24, 1951 |
| 2,574,218 | Lynch | Nov. 6, 1951 |